ated July 23, 1974

[54] TEMPERATURE CONTROL SYSTEM FOR ROTARY KILNS

[75] Inventor: Yoshizo Suga, Yokohama, Japan

[73] Assignee: Nippon Kokan Kabushiki Kaisha, Tokyo, Japan

[22] Filed: Nov. 2, 1973

[21] Appl. No.: 412,478

[30] Foreign Application Priority Data
Nov. 20, 1972  Japan............................ 47-115700

[52] U.S. Cl............. 432/36, 263/78 A, 340/228 R, 34/54, 328/3, 432/49, 432/37
[51] Int. Cl......................... F27b 7/36, G05d 23/00
[58] Field of Search ....... 432/36, 37, 42, 43, 49–57; 34/46, 54, 43; 328/3; 340/228 R; 236/78 A, 15 B

[56] References Cited
UNITED STATES PATENTS

| | | |
|---|---|---|
| 1,296,250 | 3/1919 | Wyss............................... 236/78 A |
| 3,159,212 | 12/1964 | Patrick............................. 236/78 A |
| 3,171,639 | 3/1965 | McGregor et al. ................... 432/37 |
| 3,203,678 | 8/1965 | Sawyer et al...................... 236/15 B |
| 3,437,325 | 4/1969 | Putnam et al........................ 432/37 |
| 3,606,284 | 9/1971 | Hurlbut et al. ...................... 432/49 |

FOREIGN PATENTS OR APPLICATIONS

| | | | |
|---|---|---|---|
| 456,410 | 3/1970 | Japan.................................. 432/43 |

*Primary Examiner*—John J. Camby
*Assistant Examiner*—Henry C. Yuen
*Attorney, Agent, or Firm*—Flynn and Frishauf

[57] ABSTRACT

In a rotary kiln of the type having a plurality of temperature control units, each control unit being adapted to control the opening of the damper for a shell fan in accordance with the output signal of a thermocouple, a temperature control system whereby one of a plurality of control elements constituting a stationary controller is coupled to the corresponding one of the temperature control units at a selected rotational angular position of the kiln to effect the desired temperature control, thereby sequentially selecting and actuating the temperature control units in accordance with the rotation of the kiln to control the distribution of temperature within the kiln.

6 Claims, 5 Drawing Figures

PATENTED JUL 23 1974  3,825,405

TEMPERATURE CONTROL SYSTEM FOR ROTARY KILNS

BACKGROUND OF THE INVENTION

The present invention relates to a temperature control system for a rotary kiln of the type having a plurality of shell fans, wherein the opening of the damper for each shell fan is individually controlled in accordance with the detected temperature signal of the corresponding thermocouple to thereby control the temperature distribution of the kiln as desired over the entire length of the rotary kiln.

It has been customary with rotary kilns for manufacturing cement and pelletizing kilns to measure temperature of the kiln at a selected position thereof and to effect the required automatic temperature control on the basis of the measurements. Thus, it has been impossible to control the temperature distribution over the entire length of the kiln. While research has been carried out with regard to the static characteristics under the steady state reaction conditions in the kilns as well as the dynamic characteristics during transition from one steady state to another, no satisfactory results have been obtained so far and there are a number of unsolved problems in connection with the analysis and control theory on these characteristics. Under these circumstances, therefore, if the automatic control of temperature is effected on the basis of the temperatures measured at one or two measuring points within a kiln, many difficulties will be encountered. Particularly, in processes where there is a limit to the maximum or minimum temperature of the charged substance or substances in a kiln, it is absolutely necessary to maintain the desired temperature throughout the kiln, and it has been practically impossible with the conventional control systems to operate the kiln in such a manner that these requirements may be met. Further, with the rotary kilns equipped with a shell fan, the temperature is manually controlled, requiring a great deal of skill for this control operation.

SUMMARY OF THE INVENTION

With a view to overcoming the foregoing difficulty, it is the object of the present invention to provide an improved temperature control system for rotary kilns.

The present invention is directed to an improved temperature control system for a rotary kiln having a plurality of shell fans which comprises a plurality of control units, each control unit including the control means for the damper of each shell fan, a thermocouple located to correspond to the position of the fan and one of a plurality of control elements constituting a stationary controller that is operatively associated with the combination of the fan damper and the thermocouple at a selected rotational angular position of the kiln. Also included is a signal transmitting means for sequentially switching from one control unit to the next control unit in accordance with the rotation of the kiln, whereby the temperature at any given part of the kiln may be controlled in accordance with the detected value of the associated thermocouple and hence the desired temperature may be maintained at various parts the optimum temperature distribution for the operation of the kiln over the whole length of the kiln. The signal transmitting means for interconnecting the rotating detecting points, the dampers to be controlled and the controller composed of a plurality of control elements, may comprise a signal synchronizing means, slip rings, sets of segmental slip rings, brushes and connecting wires or alternately it may comprise a computer and a radio means employing FM waves. (Here, the set of segmental slip rings means a type of slip ring which is mounted around the circumference of the kiln shell and which is divided circumferentially into a plurality of parts with electrical insulation therebetween and thus the outer appearance closely resembles to a slip ring mounted around the circumference of the kiln.) The signal transmitting means selectively actuates and releases the plurality of the control units each comprising three component parts, i.e., a thermocouple, a control element and a damper. To prevent any misoperation due to such a frequent operation, a signal is generated at each of the selected angular positions of the kiln for every revolution thereof so as to check the presence of any misoperation. Such a misoperation is automatically corrected upon the detection thereof.

DESCRIPTION OF THE PREFERRED EMBODIMENTS

Figure 1:
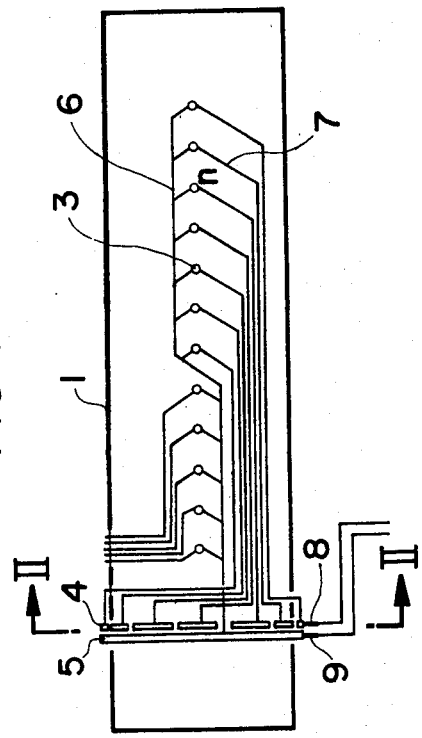
FIG. 1 is a schematic diagram of an embodiment of a temperature control system according to the present invention, showing the arrangement of thermocouples and their connections with the associated segmental slip rings, slip ring and brushes.
Figure 2:
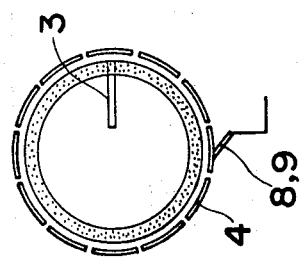
FIG. 2 is a section taken along the line II—II of FIG. 1 and viewed in the direction of the arrows.

Referring now to FIGS. 1 and 2 showing an embodiment of this invention, there is schematically shown the detecting portion of the embodiment wherein 12 thermocouples 3 are arranged in the longitudinal direction of a rotary kiln in such a manner that each of the thermocouples 3 is connected by a connecting wire 7 to the corresponding one of 12 segmental slip rings 4 which are mounted around the circumference of the shell of the rotary kiln 1 with electric insulation therebetween, and a common bus 6 of the thermocouples 3 is connected to a slip ring 5 electrically insulated from these component parts. The segmental slip rings 4 and the slip ring 5 respectively come into contact with brushes 8 and 9 to deliver the detected temperature signals of the thermocouples 3 to a stationary controller 2.

Figure 3:
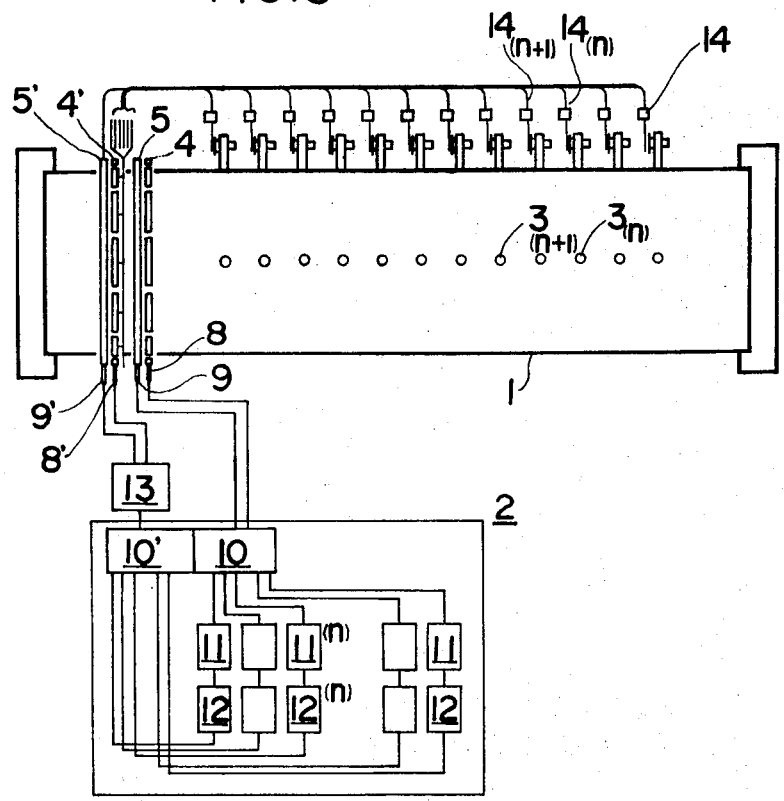
FIG. 3 is a simplified circuit diagram of the embodiment of FIG. 1, showing only the signal transmitting means, controller and dampers used and their connections.

Referring to FIG. 3 in which the detecting portion of FIG. 1 is not shown, there is illustrated the control portion which controls the operation of dampers 14 for shell fans. At a selected rotational angular position of the kiln 1, the detected temperature signal from the nth thermocouple 3 is transmitted to the controller 2 through a signal synchronizing means 10. The controller 2 comprises 12 controlling units each comprising an indicating and/or recording controller 11 and an output signal generator 12, and in this case the nth controlling unit is operated so that the input value is compared with a predetermined value in the controller 11 and the result of this comparison is converted into an on-off control signal in the output signal generator 12. This on-off control signal is then supplied through a signal synchronizing means 10' which has the same function as the signal synchronizing means 10, through an electromagnetic relay 13 and brushes 8' and 9' and segmental slip ring 4' and slip ring 5' to control the nth damper 14. As the kiln 1 rotates further, the output signal of the $(n+l)$th thermocouple 3 is connected and consequently the $(n+l)$th damper 14 is controlled in the similar manner as described earlier.

In this way, the signal synchronizing means 10 and 10' sequentially actuate the selected ones of the control units each comprising the associated thermocouple, control element and damper. The initial conditions are restored upon completion of one revolution of the kiln 1. The number of these control operations on each damper is not limited to once per revolution of the kiln 1, since it can be increased as desired by correspondingly increasing the number of sets of brushes. However, the control on each damper is effected in principle once for every rotation of the kiln 1, and the detected temperature signal from the thermocouple 3 is compared with the predetermined value in the controller 11 so that when the difference between the two values is zero, the previous output signal is maintained until the next comparison and controlling operation takes place after the completion of one operating cycle.

Figure 4:
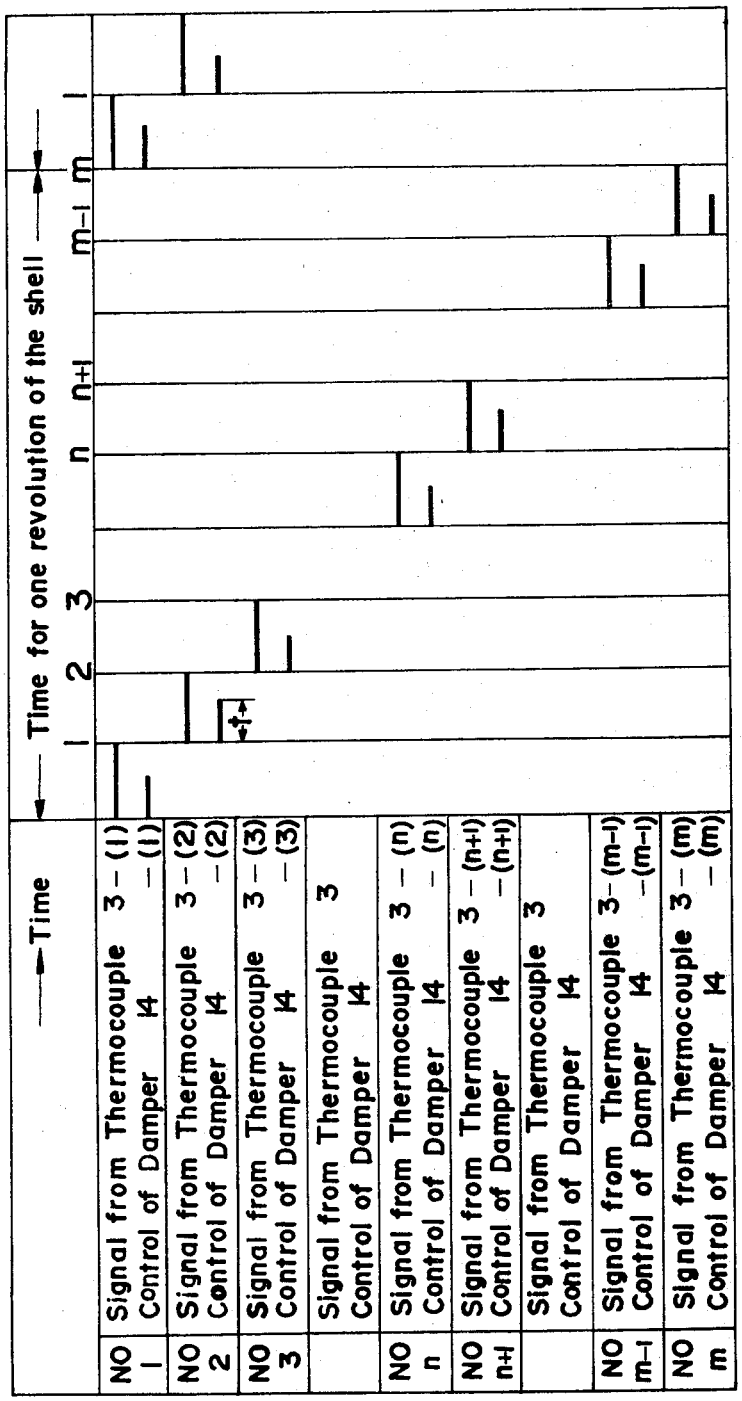
FIG. 4 is a time chart for the embodiment of FIG. 1.

FIG. 4 shows a control time chart of this embodiment. As will be seen from FIG. 4, the output signals from $m$ thermocouples are transmitted on a time division basis and a control current for operating the appropriate electrically operated damper is supplied during each time interval. This control is repeated continuously. Although the control is repeated intermittently through the loop, this loop can prove fully effective when it is used for example with a rotary kiln having a large heat capacity as well as a large systematic lag time and dead time.

Figure 5:
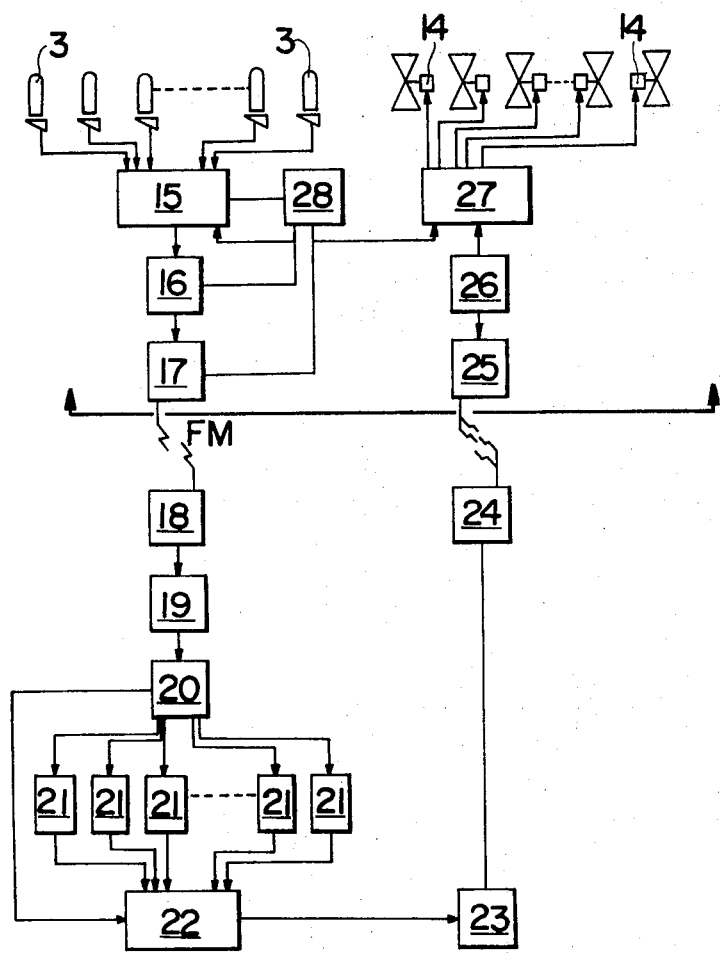
FIG. 5 is a block diagram of another embodiment of the system of this invention, wherein the signal transmitting means is based on radio transmission.

Referring now to FIG. 5, a second embodiment of this invention will be described. In this embodiment, a plurality ($m$) of thermocouples 3 for detecting the internal temperature of a rotary kiln are arranged at suitable intervals in the longitudinal direction of the rotary kiln and a like number ($m$) of fan dampers 14 for controlling the internal temperature of the kiln are arranged to cooperate with the associated thermocouples 3. Each of the thermocouples 3 is connected so that its output signal is applied to a signal synchronizing means 15, a signal converter 16 and a signal transmitter 17 which are fixedly mounted on the rotary kiln. The signal is then transmitted as a FM wave to a receiver 18 fixedly mounted outside the rotary kiln from which it is coupled to a signal converter 19, a signal synchronizing means 20, indicating and/or recording controllers 21, a signal synchronizing means 22, an operating signal converter 23 and a signal transmitter 24 from which the signal is transmitted as an FM wave to a receiver 25 mounted on the rotary kiln and to the associated one of the $m$ temperature controlling fan dampers 14 through a signal converter 26 and a signal synchronizing means 27.

With the construction described above, the operation of this embodiment is as follows. The signals from the $m$ thermocouples 3 are sequentially transmitted at regular interval of time from the signal synchronizing means 15 to the signal converter 16. These signals are converted into coded signals distinguishing the predetermined numbers of the thermocouples from the detected values, and these coded signals are transmitted as FM waves from the signal transmitter 17. These component parts are all mounted on the rotary kiln, and the receiver 18 for receiving these FM waves is installed at given position outside the rotary kiln. The signals sent to the signal converter 19 from the receiver 18 are separated into the thermocouple number signals and the detected temperature signals, and are then distributed to the respective controllers 21 by a signal synchronizing means 20. The signals from the controllers 21 are applied through the signal synchronizing means 22 to the manipulating signal converter 23 where the manipulating signals are coded and they are then transmitted as FM waves from the signal transmitter 24. These component parts are all installed at given positions outside the rotary kiln. The FM wave from the signal transmitter 24 is received by the receiver 25 fixedly mounted on the rotary kiln and it is converted into the manipulating variables in the signal converter 26. After confirmation by the signal synchronizing means 27, the manipulating variables are applied to the appropriate temperature controlling fan dampers 14 to control these dampers 14 in accordance with the coded manipulating variables. In this way, the control is sequentially effected on the combination of the final control element values for each thermocouple to maintain a predetermined temperature at every part in the kiln. In this case, a power supply 28 for the component parts mounted on the rotary kiln utilizes the rectified branch current from a battery or a fan motor power supply. Further, in order to prevent the component parts mounted on the kiln from being heated to elevated temperatures by the kiln, these component parts are located where they are exposed to the incoming fan air.

It will thus be seen from the foregoing description of the construction and operation of the temperature control system for rotary kilns according to the present invention that the present invention ensures better control of temperature in a rotary kiln, since it permits the application of heat from a source at an intermediary portion of the lengthy rotary kiln and controls the temperature at every part in the kiln in accordance with a predetermined pattern. Especially, where it is essential to strictly keep the temperature of the charged substance within its upper and/or lower limits, reliable control can be ensured. Further, the automatic control of shell fans permits the saving of labor and a higher degree of accuracy. Furthermore, according to the first embodiment of this invention there is provided a control system which is compact and economical, since the property of a rotary kiln, i.e., its large heat capacity is utilized and segmental slip rings are employed to effect the control at intervals of time with the result that any increase in the number of thermocouples and final control elements do not result in an increase in the number of the usual slip rings per se. In addition to these advantages, the second embodiment of this invention eliminates the use of any segmental slip rings and slip ring with the resultant elimination of loss due to mechanical contact as well as prevention of deteriorated accuracy due to contact nonuniformity. Further, the use of FM transmission permits the installation of the component parts at any desired positions and moreover the use of multiplex FM transmission permits simultaneous transmission of the thermocouple numbers and detected values. Still further, both of the embodiments may be used in combination with a computer control to ensure operation which is characterized by a higher degree of accuracy.

We claim:

1. In a rotary kiln having a plurality of kiln temperature control means each thereof comprising a thermocouple and an associated shell fan having a damper opening control mechanism, a temperature distribution control system comprising stationary controller means comprising a plurality of control elements, and signal transmitting means, wherein each of said control elements is coupled by said signal transmitting means to an associated one of said temperature control means at a selected rotational angular position of said rotary kiln, whereby to sequentially actuate said plurality of kiln temperature control means to control the temperature distribution in said rotary kiln.

2. A temperature distribution control system according to claim 1, wherein said signal transmitting means includes signal synchronizing means for selectively actuating said plurality of rotary kiln temperature control means in accordance with the rotational angular position of said rotary kiln.

3. A temperature distribution control system according to claim 1, wherein said signal transmitting means comprises signal synchronizing means, slip ring means, segmental slip ring means, brush means and electric circuit means for interconnection thereof.

4. A temperature distribution control system according to claim 3, wherein said signal synchronizing means comprises contactor means for selectively actuating said plurality of temperature control means in accordance with the rotational angular position of said rotary kiln.

5. A temperature distribution control system according to claim 1, wherein said signal transmitting means comprises FM transmitting and FM receiving means, and signal synchronizing means.

6. A temperature distribution control system according to claim 5, wherein said signal synchronizing means comprises electronic memory means.

* * * * *

UNITED STATES PATENT OFFICE
CERTIFICATE OF CORRECTION

Patent No. 3,825,405                     Dated July 23, 1974

Inventor(s) Yoshizo SUGA

It is certified that error appears in the above-identified patent and that said Letters Patent are hereby corrected as shown below:

Column 1, line 51, after "including" delete "the";

Column 4, line 4, change "interval" to --intervals--;

Column 5, line 14, after "control means" insert --,--;

after "each" delete "thereof" and insert --kiln temperature control means--;

line 17, after "comprising" insert --:--;

and begin a new paragraph with "stationary controller...";

line 18, change "comprising" to --including--;

and begin a new paragraph with "signal...";

line 19, after "means" delete ", wherein" insert --coupling--;

line 20, delete "is coupled by said signal transmitting means" insert --of said stationary controller--;

line 21, before "temperature" insert --kiln--;

line 23, after "kiln" delete ", whereby";

UNITED STATES PATENT OFFICE
CERTIFICATE OF CORRECTION

Patent No. 3,825,405　　　　　　　　　　Dated July 23, 1974

Inventor(s) Yoshizo SUGA

It is certified that error appears in the above-identified patent and that said Letters Patent are hereby corrected as shown below:

- 2 -

Column 6, line 3, delete "rotary";

line 9, after "ring means" insert --selected segments of which are coupled to respective kiln temperature control means, after "brush means" insert --coupling said slip ring means and said segmental slip ring means to said synchronizing means--.

Signed and sealed this 26th day of November 1974.

(SEAL)
Attest:

McCOY M. GIBSON JR.　　　　　　　　　C. MARSHALL DANN
Attesting Officer　　　　　　　　　　Commissioner of Patents